(12) United States Patent
Su et al.

(10) Patent No.: US 8,115,865 B2
(45) Date of Patent: Feb. 14, 2012

(54) DE-INTERLACING SYSTEM WITH AN ADAPTIVE EDGE THRESHOLD AND INTERPOLATING METHOD THEREOF

(75) Inventors: Te-Sung Su, Jhubei (TW); Yen-Lin Chen, Sindian (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 968 days.

(21) Appl. No.: 12/076,571

(22) Filed: Mar. 20, 2008

(65) Prior Publication Data

US 2008/0231748 A1    Sep. 25, 2008

(30) Foreign Application Priority Data

Mar. 21, 2007    (TW) ................ 96109660 A

(51) Int. Cl.
*H04N 7/01* (2006.01)
*H04N 5/14* (2006.01)

(52) U.S. Cl. ......... 348/448; 348/441; 348/452; 348/699

(58) Field of Classification Search .................. 348/441, 348/448, 452, 699
See application file for complete search history.

(56) References Cited

U.S. PATENT DOCUMENTS

| 6,269,484 B1 * | 7/2001 | Simsic et al. ................. 725/151 |
| 7,136,108 B2 * | 11/2006 | Nagakura et al. ............. 348/452 |
| 2002/0047919 A1 * | 4/2002 | Kondo et al. ................. 348/441 |

* cited by examiner

*Primary Examiner* — Kieu Oanh T Bui
(74) *Attorney, Agent, or Firm* — Bacon & Thomas, PLLC

(57) ABSTRACT

A de-interlacing system with an adaptive edge threshold has a motion factor generator to produce a motion factor of a position in accordance with a previous and a next fields. An adaptive edge threshold generator produces the adaptive edge threshold in accordance with a current, the previous and the next fields. A determinator determines which pixels are used to perform an interpolation on the position. When the motion factor is greater than the adaptive edge threshold, a pixel of the current field is used to perform an interpolation on the position. When the motion factor is smaller than the adaptive edge threshold, a pixel of the previous field and a pixel of the next field are used to perform an interpolation on the position.

17 Claims, 5 Drawing Sheets

DE-INTERLACING SYSTEM WITH AN ADAPTIVE EDGE THRESHOLD AND INTERPOLATING METHOD THEREOF

BACKGROUND OF THE INVENTION

1. Field of the Invention

The present invention relates to the technical field of image processing and, more particularly, to a de-interlacing system with an adaptive edge threshold and the interpolating method thereof.

2. Description of Related Art

Due to the limitation of broadcast bandwidth, current TV broadcasting typically uses alternate odd/even fields. As shown in FIG. 1, odd fields 10 and 12 have only odd-line video data, and even fields 11 and 13 have only even-line video data. A line doubler is required in a new-generation TV to perform a double frequency processing for meeting with the increased vertical resolution. The simplest double frequency processing directly merges tandem odd and even fields to thereby form a progressive scan frame. However, because of a time difference between the tandem odd and even fields, such a processing introduces a sawtooth to a moving object image.

Since such a processing introduces a sawtooth to a moving object image in the dynamic picture, the prior art determines if the field currently used is the motion picture in order to overcome the aforementioned problem. When the field is the motion picture, a single field is interpolated as a frame to avoid the sawtooth. When the field is not the motion picture but a still picture, tandem odd and even fields are merged for use to thereby avoid a flicker.

Typically, images are determined as motion pictures by a fixed threshold. When the amount of motion is greater than the threshold, the images are determined as the motion pictures. When the amount of motion is smaller than the threshold, the images are determined as still pictures. However, such a fixed threshold can cause a mistaken determination when the images come from different sources or pictures.

To overcome the aforementioned problem, U.S. Pat. No. 7,027,099 B2 has disclosed a method, which analyzes whether an image is of a motion picture in frequency domain, thereby avoiding the mistaken determination. However, such a method requires changing the image into the frequency domain, which relatively increases the computation amount and causes the cost.

Therefore, it is desirable to provide an improved system and method to mitigate and/or obviate the aforementioned problems.

SUMMARY OF THE INVENTION

An object of the present invention is to provide a de-interlacing system with an adaptive edge threshold and the interpolating method thereof, which can avoid the mistaken determination typically caused by applying the fixed threshold to determine if an image is of a motion picture and further enhance the image quality.

Another object of the present invention is to provide a de-interlacing system with an adaptive edge threshold and the interpolating method thereof, which can avoid increasing the system cost in the prior art.

In accordance with one aspect of the invention, there is provided a de-interlacing system with an adaptive edge threshold, which receives a video datastream consisting of plural fields, each field having plural rows of pixels arranged in a two-dimension array. The de-interlacing system interpolates additional pixels, each interpolated pixel locating at a position of the field, to thereby increase the resolution of the field. The de-interlacing system includes a motion factor generator, an adaptive edge threshold generator and a determinator. The motion factor generator receives a previous and a next fields adjacent to a current field to thereby produce a motion factor for the position. The adaptive edge threshold generator receives the current field, the previous field and the next field to thereby produce an adaptive edge threshold for the position. The determinator is connected to the motion factor generator and the adaptive edge threshold generator in order to determine which pixels are used to perform an interpolation on the position in accordance with the motion factor and the adaptive edge threshold. When the motion factor is greater than the adaptive edge threshold, a pixel of the current field is used to perform the interpolation on the position. When the motion factor is smaller than the adaptive edge threshold, a pixel of the previous field and a pixel of the next field are used to perform an interpolation on the position.

In accordance with another aspect of the invention, there is provided an interpolating method with an adaptive edge threshold, which receives a video datastream consisting of a plurality of fields, each field having a plurality of rows of pixels arranged in a two-dimension array. The interpolating method interpolates additional pixels, each interpolated pixel locating at a position of the field, to thereby increase the resolution of the field. The interpolating method includes: a motion factor generating step, which receives a previous field and a next field adjacent to a current field to thereby produce a motion factor for the position; an adaptive edge threshold generating step, which receives the current field, the previous field and the next field to thereby produce an adaptive edge threshold for the position; and a determining step, which determines which pixels are used to perform an interpolation on the position in accordance with the motion factor and the adaptive edge threshold. When the motion factor is greater than the adaptive edge threshold, a pixel of the current field is used to perform the interpolation on the position. When the motion factor is smaller than the adaptive edge threshold, a pixel of the previous field and a pixel of the next field are used to perform an interpolation on the position.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
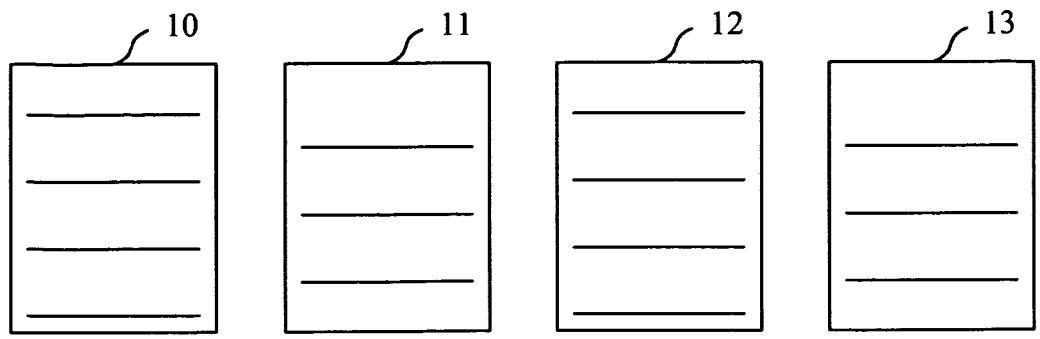
FIG. 1 is a schematic diagram of typical display fields of a video camera signal.
Figure 2:
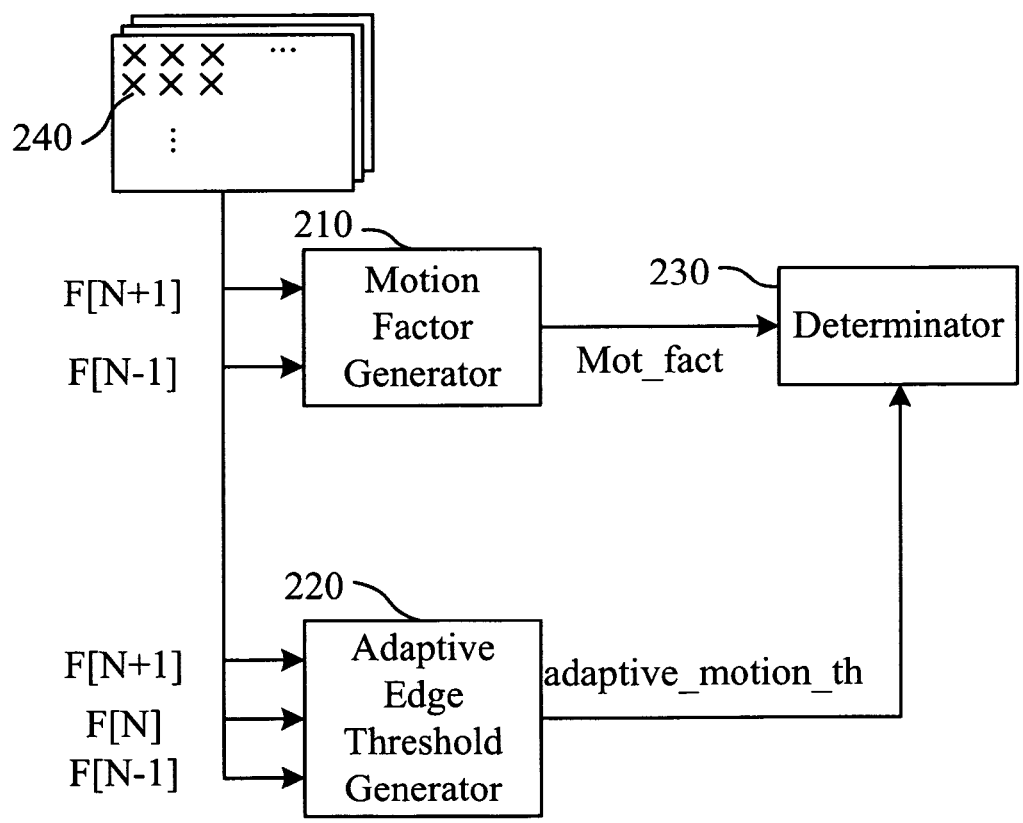
FIG. 2 is a block diagram of a de-interlacing system with an adaptive edge threshold in accordance with the invention.

FIG. 2 is a block diagram of a de-interlacing system with an adaptive edge threshold in accordance with the invention. The system receives a video datastream consisting of plural fields. Each field F has plural rows of pixels 240 arranged in a 2D array. The system uses additional pixels 240, each locating at a position of the field F, to thereby increase the resolution. The system includes a motion factor generator 210, an adaptive edge threshold generator 220 and a determinator 230.

The motion factor generator 210 receives a previous field F[N−1] and a next field F[N+1] respectively adjacent to a current field F[N] to thereby produce a motion factor Mot_fact for the position.

The adaptive edge threshold generator 220 receives the current, the previous and the next fields F[N], F[N−1] and F[N+1] to thereby produce an adaptive edge threshold adaptive_motion_th for the position.

The determinator 230 is connected to the motion factor generator 210 and the adaptive edge threshold generator 220 in order to receive the motion factor Mot_fact and the adaptive edge threshold adaptive_motion_th and accordingly determine which approach is used to interpolate a pixel to the position.

Figure 3:
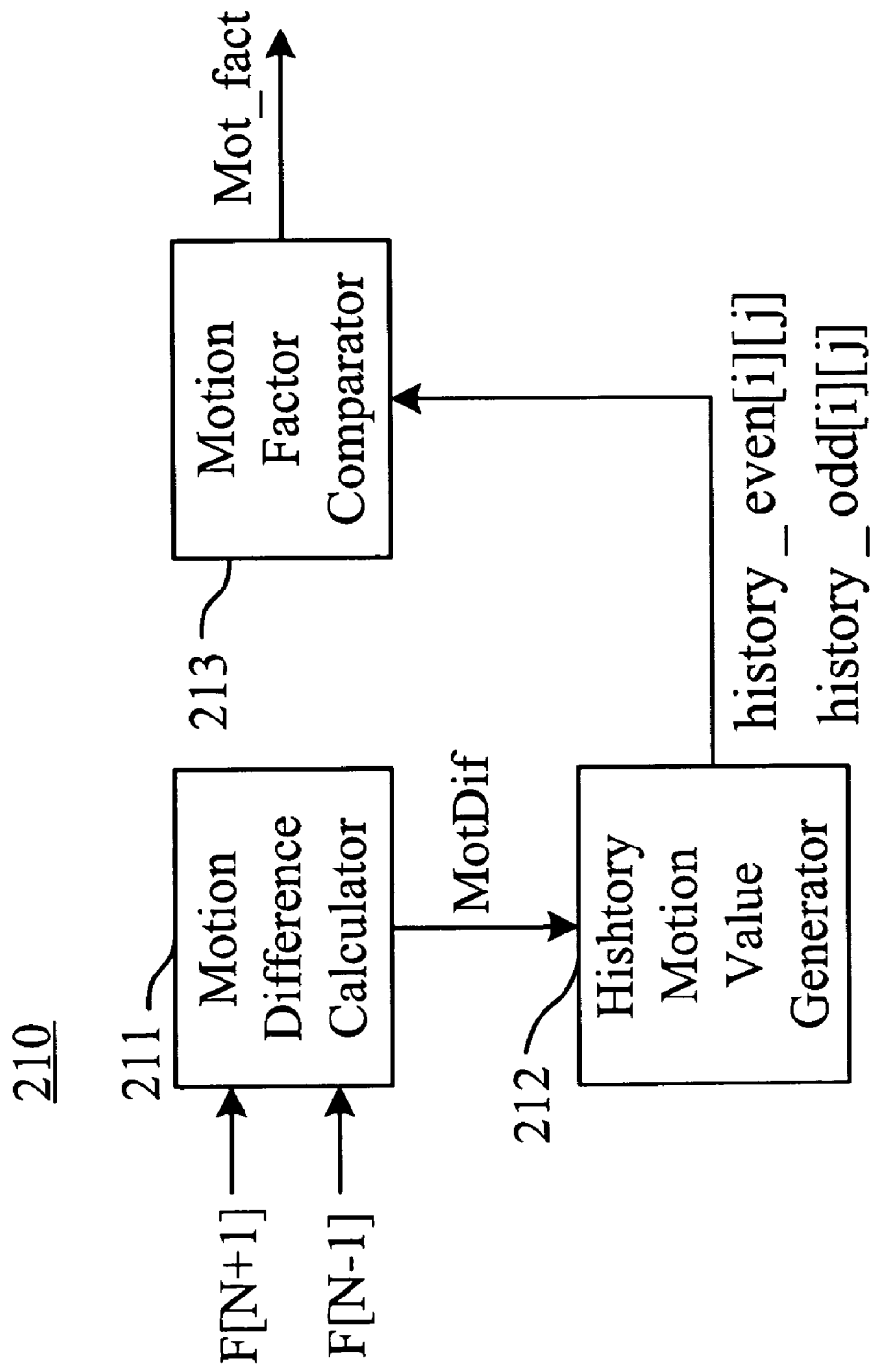
FIG. 3 is a block diagram of a motion factor generator in accordance with the invention.

FIG. 3 is a block diagram of the motion factor generator 210 in accordance with the invention. The motion factor generator 210 includes a motion difference calculator 211, a history motion value generator 212 and a motion factor comparator 213.

The motion difference calculator 211 receives the previous and the next fields F[N−1] and F[N+1] in order to compute a signal difference at a same position between the fields F[N−1] and F[N+1] to thereby produce a motion difference MotDif for the position.

The history motion value generator 212 is connected to the motion difference calculator 211 in order to compute a current odd and a current even field history factors for the position in accordance with the motion difference MotDif and a history factor for the position.

Figure 4:
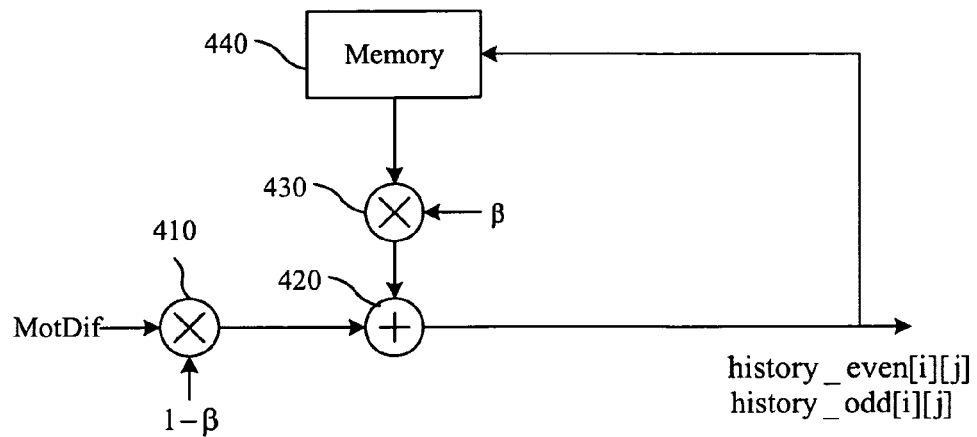
FIG. 4 is a block diagram of a history motion value generator in accordance with the invention.

FIG. 4 is a block diagram of the history motion value generator 212 in accordance with the invention. The history motion value generator 212 includes a first multiplier 410, a first adder 420, a second multiplier 430 and a memory 440.

The memory 440 stores the history factor of each pixel of the previous field. The history factor of each pixel contains an odd and an even field history factors.

When the current field F[N] is an odd field, the current odd field history factor history_odd[i][j] for the position is the odd field history factor history_odd_old[i][j] of the previous field stored in the memory 440 with respect to the position, and the current even field history factor history_even[i][j] for the position is a result of performing a weighting operation on MotDif and history_even_old[i][j], where the value MotDif indicates a motion difference produced by the motion difference calculator and the value history_even_old[i][j] indicates the even field history factor of the previous field stored in the memory 440 with respect to the position, and the result is written back to the memory 440.

When the current field F[N] is an even field, the current even field history factor history_even[i][j] for the position is the even field history factor history_even_old[i][j] of the previous field stored in the memory 440 with respect to the position, and the current odd field history factor history_odd for the position is a result of performing a weighting on MotDif and history_odd_old[i][j], where the value MotDif indicates a motion difference produced by the motion difference calculator and the value history_odd_old[i][j] indicates the odd field history factor of the previous field stored in the memory 440 with respect to the position, and the result is written back to the memory 440.

The motion factor comparator 213 is connected to the history motion value generator 212 in order to select the bigger one from the current odd and the current even field history factors as the motion factor Mot_fact for the position.

Figure 5:
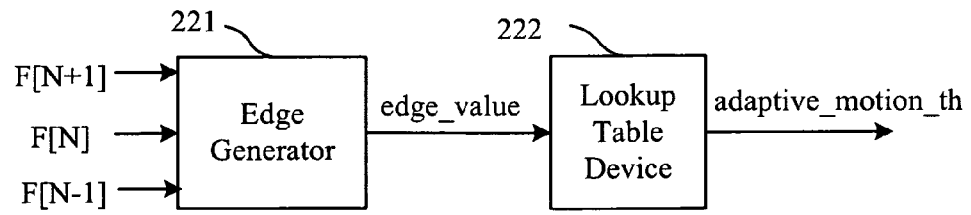
FIG. 5 is a block diagram of an adaptive edge threshold generator in accordance with the invention.

FIG. 5 is a block diagram of the adaptive edge threshold generator 220 in accordance with the invention. The adaptive edge threshold generator 220 includes an edge generator 221 and a lookup table device 222. The edge generator 221 receives the current field F[N], the previous field F[N−1] and the next field F[N+1] to thereby produce an edge value edge_value for the position.

Figure 6:
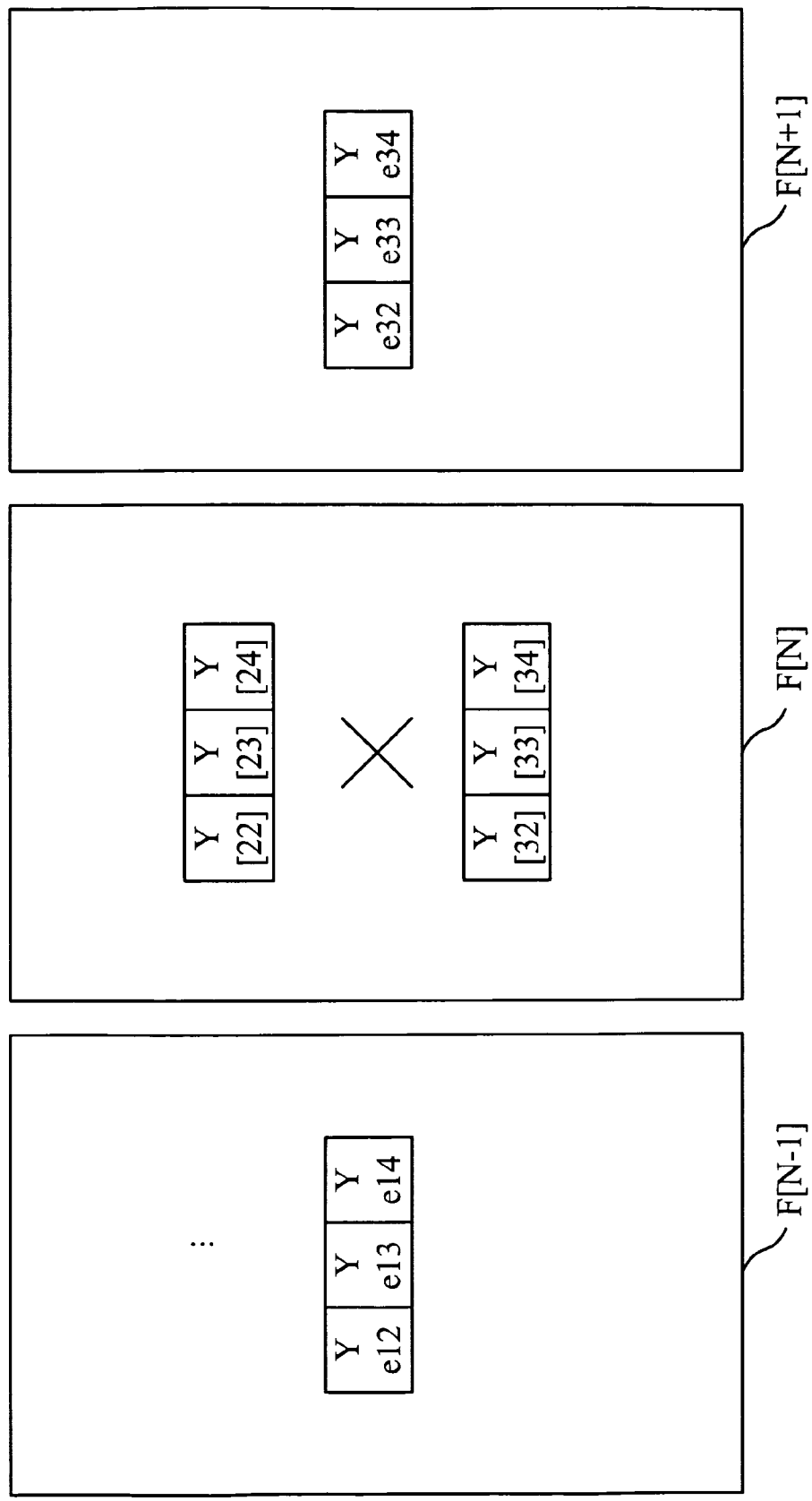
FIG. 6 is a schematic diagram of an edge value produced by an edge generator in accordance with the invention.

FIG. 6 is a schematic diagram of the edge value edge_value produced by the edge generator 221 in accordance with the invention. As shown in FIG. 6, the position X locates in the current field F[N], and if the current field F[N] is shown as ODD2, the previous field F[N−1] is shown as EVEN1, and the next field F[N+1] is shown as EVEN3, the edge generator 221 can compute edge_value for the position based on equation (6) as follows:

$$edge\_value=[4*(Ye13+Ye33)-Ye12-Ye14-Ye22-Ye23-Ye24-Ye32-Ye33-Ye34]/8. \quad (6)$$

In other embodiments, the edge generator 221 can produce edge_value using a conventional technique.

The lookup table device 222 is connected to the edge generator 221 in order to produce the adaptive edge threshold adaptive_motion_th in accordance with the edge value edge_value for the position.

Figure 7:
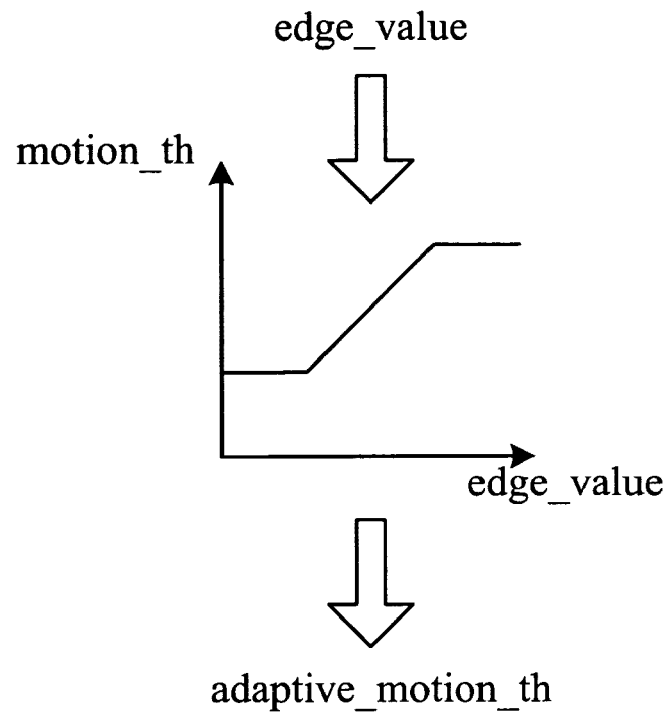
FIG. 7 is a schematic graph of an embodiment of adaptive edge thresholds produced by a lookup device in accordance with the invention.

FIG. 7 is a schematic graph of an embodiment of the adaptive edge threshold adaptive_motion_th produced by the lookup device 222 in accordance with the invention. Namely, the lookup table device 222 receives the edge value edge_value produced by the edge generator 221 and compares it with a lookup table to thereby produce the adaptive edge threshold adaptive_motion_th.

Figure 8:
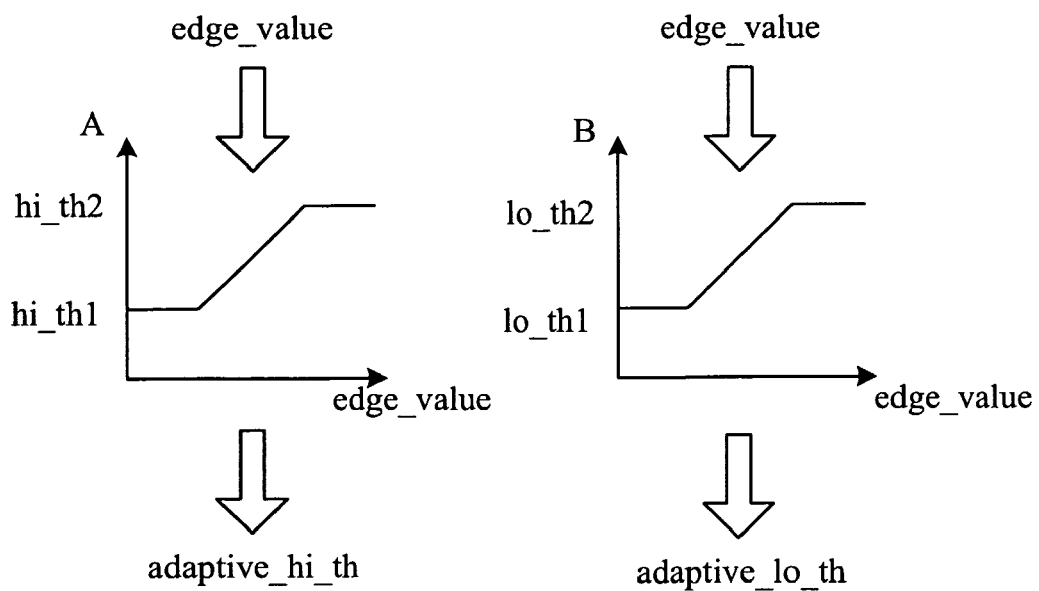
FIG. 8 is a schematic graph of another embodiment of adaptive edge thresholds produced by a lookup device in accordance with the invention.

FIG. 8 is a schematic graph of another embodiment of the adaptive edge threshold adaptive_motion_th produced by the lookup device 222 in accordance with the invention. In this embodiment, the adaptive edge threshold adaptive_motion_th can be a set of values. Namely, the lookup table device 222 receives the edge value edge_value produced by the edge generator 221, and compares it with a lookup table A to thereby produce a high adaptive edge threshold adaptive_hi_th and with a lookup table B to thereby produce a low adaptive edge threshold adaptive_lo_th. In this case, the adaptive edge threshold adaptive_motion_th contains the high adaptive edge threshold adaptive_hi_th and the low adaptive edge threshold adaptive_lo_th.

The determinator 230 is connected to the motion factor generator 210 and the adaptive edge threshold generator 220 in order to receive the motion factor Mot_fact and the adaptive edge threshold adaptive_motion_th and accordingly determine which approach is used to interpolate a pixel to the position.

When the motion factor is greater than the adaptive edge threshold, it indicates that the current field F[N] is a motion picture, and thus a pixel of the current field is used to perform the interpolation on the position.

When the motion factor is smaller than the adaptive edge threshold, it indicates that the current field F[N] is a still picture, and thus a pixel of the previous field and a pixel of the next field are used to perform an interpolation on the position.

As cited, the prior art only uses a fixed threshold to determine if an image is a motion picture or a still picture, which can be used in an image with simple content. However, when the content of an image is complex, the mistaken determination frequently occurs in the prior art, and an incorrect interpolation is used, which causes either a sawtooth or a blur on a synthesized image. By contrast, the invention determines edge_value on each pixel and uses the motion factor generator 210 to produce the motion difference MotDif based on the previous field F[N−1] and the next field F[N+1] and the motion factor Mot_fact of the pixel by further referring to the history factor. The pixel between the current field F[N] and the previous and next fields F[N−1] and F[N+1] has a certain correspondence. Thus, the invention can perform a proper interpolation because an image to be a motion picture or a still picture is accurately determined more than in the prior art, and thus an image quality is increased. In addition, the determination of a edge value is performed on each pixel, which applies different thresholds to each pixel to thereby reflect the real image condition and obtain a better determination.

Although the present invention has been explained in relation to its preferred embodiment, it is to be understood that many other possible modifications and variations can be made without departing from the spirit and scope of the invention as hereinafter claimed.

What is claimed is:

1. A de-interlacing system with an adaptive edge threshold, which receives a video datastream consisting of plural fields, each said field having plural rows of pixels arranged in a two-dimension array, and interpolates additional pixels, each said additional pixel locating at a position of the field, to thereby increase the resolution of field, the de-interlacing system comprising:
   a motion factor generator, which receives a previous field and a next field respectively adjacent to a current field to thereby produce a motion factor for the position;
   an adaptive edge threshold generator, which receives the current field, the previous field and the next field to thereby produce an adaptive edge threshold for the position; and
   a determinator, which is connected to the motion factor generator and the adaptive edge threshold generator in order to determine which pixels are used to perform an interpolation on the position in accordance with the motion factor and the adaptive edge threshold;
   wherein a pixel of the current field is used to perform the interpolation on the position when the motion factor is greater than the adaptive edge threshold, a pixel of the previous field and a pixel of the next field are used to perform an interpolation on the position when the motion factor is smaller than the adaptive edge threshold, and the pixels of the current field, the previous field and the next field are weighted to perform an interpolation on the position when the motion factor is between a high adaptive edge threshold and a low adaptive edge threshold.

2. The system as claimed in claim 1, wherein the motion factor generator comprises:
   a motion difference calculator, which receives the previous field and the next field to thereby produce a motion difference for the position;
   a history motion value generator, which is connected to the motion difference calculator in order to compute a current odd and a current even field history factors in accordance with the motion difference and a history factor for the position; and
   a motion factor comparator, which is connected to the history motion value generator in order to select the current odd field history factor or the current even field history factor as the motion factor for the position.

3. The system as claimed in claim 2, wherein the history motion value generator further comprises:
   a memory, which stores the history factor of the previous field.

4. The system as claimed in claim 3, wherein the history factor of each pixel comprises an odd field history factor and an even field history factor.

5. The system as claimed in claim 4, wherein the current odd field history factor for the position is the odd field history factor of the previous field stored in the memory with respect to the position when the current field is an odd field.

6. The system as claimed in claim 5, wherein the current even field history factor for the position is a result of performing a weighting operation on the motion difference and the even field history factor of the previous field stored in the memory with respect to the position when the current field is the odd field.

7. The system as claimed in claim 4, wherein the current even field history factor for the position is the even field history factor of the previous field stored in the memory with respect to the position when the current field is an even field.

8. The system as claimed in claim 7, wherein when the current field is the even field, the current odd field history factor for the position is a result of performing a weighting operation on the motion difference and the odd field history factor of the previous field stored in the memory with respect to the position.

9. The system as claimed in claim 1, wherein the adaptive edge threshold generator comprises:
   an edge generator, which receives the current field, the previous field and the next field to thereby produce an edge value for the position; and
   a lookup table device, which is connected to the edge generator in order to produce the adaptive edge threshold in accordance with the edge value for the position.

10. An interpolating method with an adaptive edge threshold, which receives a video datastream consisting of plural fields, each said field having plural rows of pixels arranged in a two-dimension array, and interpolates additional pixels, each said additional pixel locating at a position of the field, to thereby increase the resolution of field, the interpolating method comprising:
    a motion factor generating step, which receives a previous field and a next field respectively adjacent to a current field to thereby produce a motion factor for the position;
    an adaptive edge threshold generating step, which receives the current field, the previous field and the next field to thereby produce an adaptive edge threshold for the position; and
    a determining step, which determines which pixels are used to perform an interpolation on the position in accordance with the motion factor and the adaptive edge threshold;
    wherein the pixel of current field is used to perform the interpolation on the position when the motion factor is greater than the adaptive edge threshold, and the pixel of previous field and the pixel of next field are used to perform an interpolation on the position when the motion factor is smaller than the adaptive edge threshold.

11. The method as claimed in claim 10, wherein the motion factor generating step comprises:

a motion difference calculating step, which receives the previous field and the next field to thereby produce a motion difference for the position;

a history motion value generating step, which computes a current odd and a current even field history factors in accordance with the motion difference and a history factor for the position; and a motion factor comparing step, which selects the current odd field history factor or the current even field history factor as the motion factor for the position.

12. The method as claimed in claim 11, wherein the history factor of each pixel comprises an odd field history factor and an even field history factor.

13. The method as claimed in claim 11, wherein the adaptive edge threshold generating step comprises:

an edge generating step, which produces an edge value for the position in accordance with the current field, the previous field and the next field to thereby; and a lookup table step, which produces the adaptive edge threshold in accordance with the edge value for the position.

14. The method as claimed in claim 12, wherein the current odd field history factor for the position is the odd field history factor of previous field stored in the memory with respect to the position when the current field is an odd field.

15. The method as claimed in claim 14, wherein the current even field history factor for the position is a result of performing a weighting operation on the motion difference and the even field history factor of previous field stored in the memory with respect to the position when the current field is the odd field.

16. The method as claimed in claim 13, wherein the current even field history factor for the position is the even field history factor of previous field stored in the memory with respect to the position when the current field is an even field.

17. The method as claimed in claim 16, wherein when the current field is the even field, the current odd field history factor for the position is a result of performing a weighting operation on the motion difference and the odd field history factor of previous field stored in the memory with respect to the position.

* * * * *